United States Patent
Lowell

(10) Patent No.: US 9,908,480 B1
(45) Date of Patent: Mar. 6, 2018

(54) SELF LEVELING STEERING WHEEL MOUNT ASSEMBLY

(71) Applicant: Thomas A. Lowell, Talent, OR (US)

(72) Inventor: Thomas A. Lowell, Talent, OR (US)

(*) Notice: Subject to any disclaimer, the term of this patent is extended or adjusted under 35 U.S.C. 154(b) by 0 days.

(21) Appl. No.: 15/408,436

(22) Filed: Jan. 18, 2017

(51) Int. Cl.
*B60R 11/02* (2006.01)
*B60R 11/00* (2006.01)

(52) U.S. Cl.
CPC .......... *B60R 11/02* (2013.01); *B60R 11/0241* (2013.01); *B60R 11/0258* (2013.01); *B60R 2011/001* (2013.01); *B60R 2011/0085* (2013.01)

(58) Field of Classification Search
CPC .................... B60R 2011/001; B60N 3/005
USPC ........................................... 224/276
See application file for complete search history.

(56) References Cited

U.S. PATENT DOCUMENTS

| | | | | |
|---|---|---|---|---|
| 4,850,015 A * | 7/1989 | Martin | ............ | B60R 11/0241 224/276 |
| 5,697,071 A * | 12/1997 | Fan | ............ | H04B 1/3833 220/4.02 |
| 6,149,116 A * | 11/2000 | Won | ............ | B60R 11/0241 224/553 |
| 6,305,217 B1 * | 10/2001 | Mansfeld | ............ | G12B 9/08 224/276 |
| 6,328,271 B1 * | 12/2001 | Haage | ............ | B60R 11/0241 224/558 |
| 6,840,487 B2 * | 1/2005 | Carnevali | ............ | A47B 23/002 248/346.06 |
| 6,888,940 B1 * | 5/2005 | Deppen | ............ | B60R 11/0241 379/446 |
| 7,062,300 B1 * | 6/2006 | Kim | ............ | B60R 11/0241 379/454 |
| 7,374,142 B2 * | 5/2008 | Carnevali | ............ | F16M 13/00 224/183 |
| 7,992,831 B2 * | 8/2011 | Fan | ............ | B60R 11/00 248/205.5 |
| 8,360,378 B1 * | 1/2013 | Owens | ............ | B60R 11/02 24/3.11 |
| 8,496,144 B2 * | 7/2013 | Son | ............ | B60R 11/02 224/276 |
| 9,193,375 B2 * | 11/2015 | Schramm | ............ | B60K 35/00 |
| 9,369,790 B2 * | 6/2016 | Schreiber | ............ | H04R 1/08 |
| 9,637,062 B2 * | 5/2017 | Tyrer | ............ | B60R 11/02 |
| 2005/0077334 A1 * | 4/2005 | Craig, Jr. | ............ | B60N 3/005 224/276 |

(Continued)

*Primary Examiner* — Brian D Nash
(74) *Attorney, Agent, or Firm* — N. J. Aquilino

(57) ABSTRACT

The combination of a vehicle steering wheel assembly and an electronic device mounting system that enables the device to be mounted on said steering wheel assembly and maintained thereon in a substantially vertical position regardless of the rotational position of the steering wheel. A mounting stud is centrally located on the steering wheel assembly and a mounting clip is attached to the electronic device having a structure for attachment to the mounting stud whereby the mounting clip and the mounting stub are characterized by being freely movable each with the other whereby the device is maintained in a substantially vertical position by gravity regardless of the position of the steering wheel. A safety strap maintains the device attached to the steering wheel assembly and includes a first end attached to the mounting stud and a second end attached to the steering wheel.

10 Claims, 5 Drawing Sheets

(56) References Cited

U.S. PATENT DOCUMENTS

2007/0029359 A1* 2/2007 Smith ................... B60R 11/02
                                                     224/276
2011/0024470 A1* 2/2011 Hajarian ............ B60R 11/0241
                                                     224/276

* cited by examiner

SELF LEVELING STEERING WHEEL MOUNT ASSEMBLY

PRIORITY APPLICATION

Applicant claims priority of the filing date of provisional application titled SELF LEVELING VEHICLE STEERING WHEEL SMART PHONE QUICK RELEASE MOUNTING filed Feb. 29, 2016, Application No. 62/301,323.

FIELD OF THE INVENTION

The present invention relates to a self-leveling, hands free mounting device for a vehicle steering wheel.

BACKGROUND OF THE INVENTION

The use of electronic devices, such as cell phones or Global Positioning Systems, GPS, by the driver of a vehicle has become commonplace in modern society. Typically use of this equipment is distracting particularly if the electronic device is required to be hand held by the driver. These types of distractions are particularly dangerous and have been known to cause serious accidents. Even when mounting structures are provided on or above the dashboard, the driver typically must remove the hands from the steering wheel to engage the electronic device thereby diverting attention from the task of safely driving the vehicle.

It has been recognized that mounting of the electronic device on the steering wheel of the vehicle provides easy access to the driver whereby the device is visually available and requires a minimum use of the driver's hands while driving. For example, U.S. Pat. No. 6,305,217 shows a cell phone mounted on the steering wheel of the vehicle, however the cell phone holder is permanently attached whereby the cell phone rotates with the wheel as it is turned making it difficult to view still causing a distraction to the driver.

An improvement is shown in Publication Number 2011/0024470 to Hajarian that discloses a cell phone mount on the center console of a typical steering wheel assembly that includes a rotatable platform mounted on the steering wheel to which the cell phone is attached.

SUMMARY OF THE INVENTION

The present invention relates to a mounting device attached to a vehicle steering wheel for mounting a cell phone, GPS display, electronic tablet or similar electronic device that allows the device to be self-leveling when the steering wheel is turned by the driver without interaction by the driver. The mounting device is a quick release system using a mounting stud attached to the wheel console or similar mounting platform that forms a part of the steering wheel assembly. The electronic device includes an attached clip that engages and is freely rotatable on the stud. The mounting device provides a convenient, close proximity location, resulting in minimum use of the driver's hands allowing the driver's maximum attention to the road and the more important task of driving the vehicle.

In the preferred embodiment, the clip is permanently attached to the electronic device and may be used to mount the device on the belt of the user or any other suitable mounting structure when not mounted on the steering wheel.

The mounting clip is attached to the electronic device and a mounting stud is attached to the console portion of the steering wheel assembly such that the device is positioned in close proximity to the driver. The mounting stud is a smooth, cylindrical member with an enlarged head at the end thereof. The mounting clip is formed with a generally inverted U-shape and includes a key-shaped opening on an outside leg of the clip to engage and be rotatably supported by the mounting stud. Preferably the opening is perpendicular to the axis of the clip.

This arrangement is almost entirely frictionless whereby an electronic device mounted with this assembly is able to hang in a vertical position regardless of the position of the steering wheel. Preferably the clip includes a pair of protuberances in the keyhole opening that create a snap on fit with the mounting stud to maintain the electronic device in place should the air bag in the steering wheel console be deployed.

The mounting assembly includes a safety strap connected between the steering wheel and the mounting stud to prevent the mounting assembly from projecting outwardly towards the driver and striking and seriously injuring the driver in the event of an accident where the air bag deploys.

Among the objects of the present invention is the provision of an electronic device mounting assembly for the steering wheel of a vehicle that maintains the electronic device in a substantially vertical position regardless of the position of the wheel.

Another object is the provision of a steering wheel mounting assembly including a safety strap that maintains the mounting assembly and device being mounted connected to the steering wheel in the event of an air bag deployment.

These and other objects will be apparent with reference to the following specification and accompanying drawings.

DESCRIPTION OF THE PREFERRED EMBODIMENTS

Figure 1:
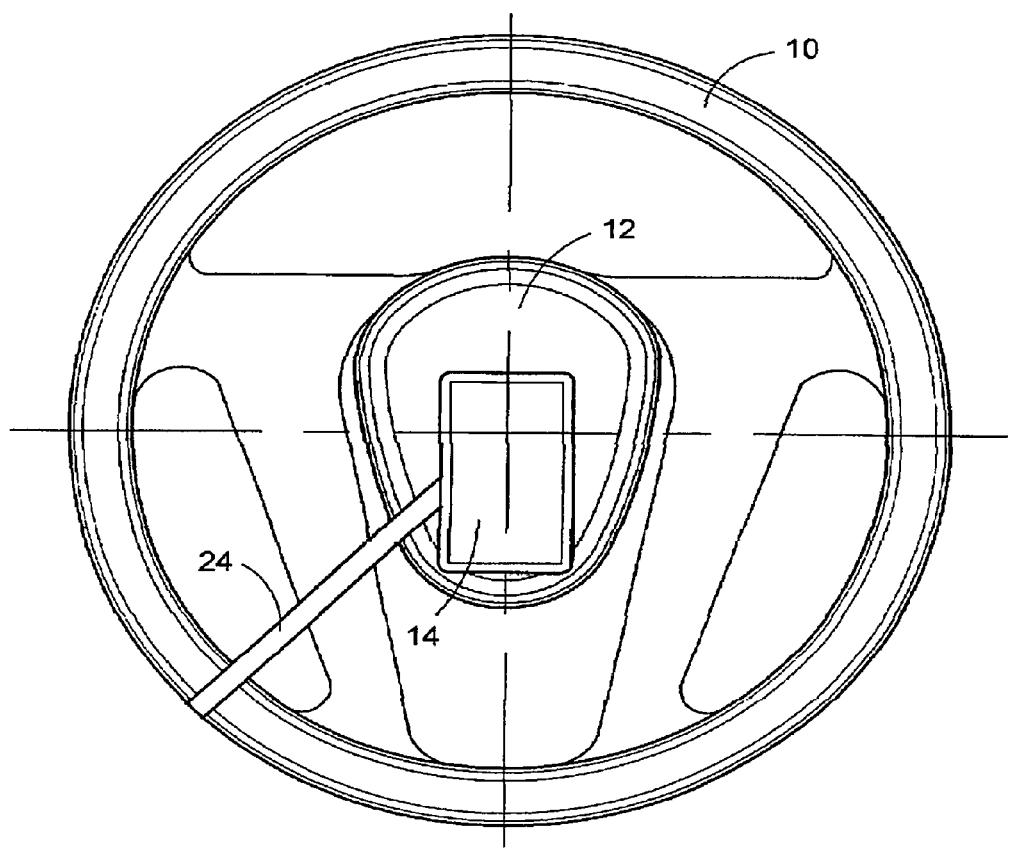
FIG. 1 is a front view of a steering wheel assembly showing an electronic device mounted thereon in accordance with the present invention.

FIG. 1 shows a conventional steering wheel 10 with a center console 12 and a cell phone type electronic device 14 with a safety strap 24 attached to the console 12 and steering wheel 10 as described below.

Figure 2:
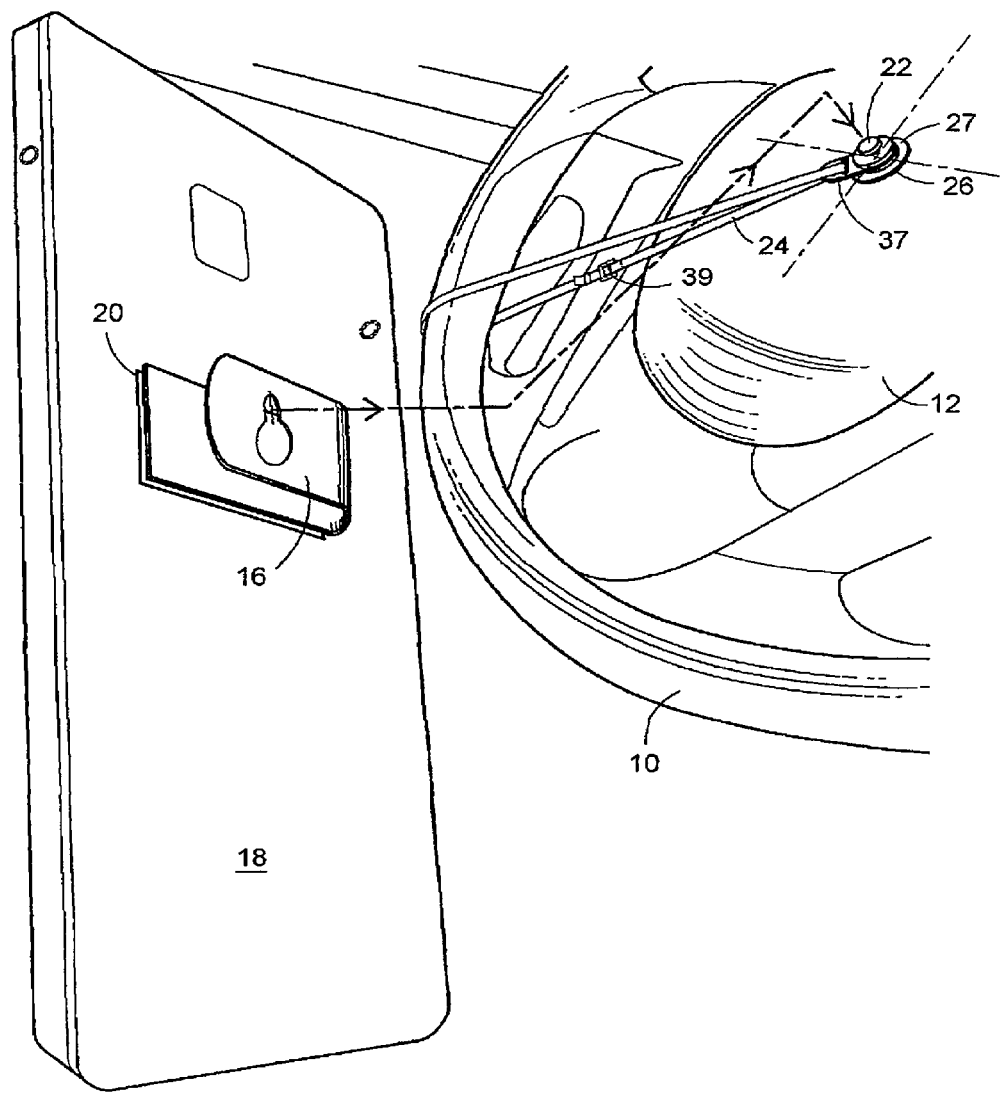
FIG. 2 is an exploded view of the steering wheel assembly and electronic device of FIG. 1 showing how the device mates to the mounting stud.

FIG. 2 is an exploded view of the steering wheel 10 and console 12 and a rear view of a cell phone device 14 having a mounting clip 16 attached to the rear wall 18 of the device 14 or the protective housing or cover. The clip 16 may be attached in a conventional manner by adhesive or using a double sided adhesive strip 20. A centrally located mounting stud 22 is attached to the console 12 also in a conventional manner by adhesive and/or double face adhesive tape 29.

The safety strap 24 is attached to the wheel 10 and mounting stud 22 to maintain the cell phone device in place in the event of a sudden movement or deployment of the air bag under the steering wheel console 12. A first portion of the safety strap 24 is connected to the mounting stud 22, as shown in detail in FIG. 7, through a slot 50 in a tab strap connection tab 37 coupled to the mounting stud 22. A second portion of the strap 24 is preferably wrapped around the steering wheel 10 in a loop and adjusted using a conventional buckle 39. The safety strap 24 is made of high strength material such as nylon or similar high strength plastic or metal.

Figures 3, 5, 6:
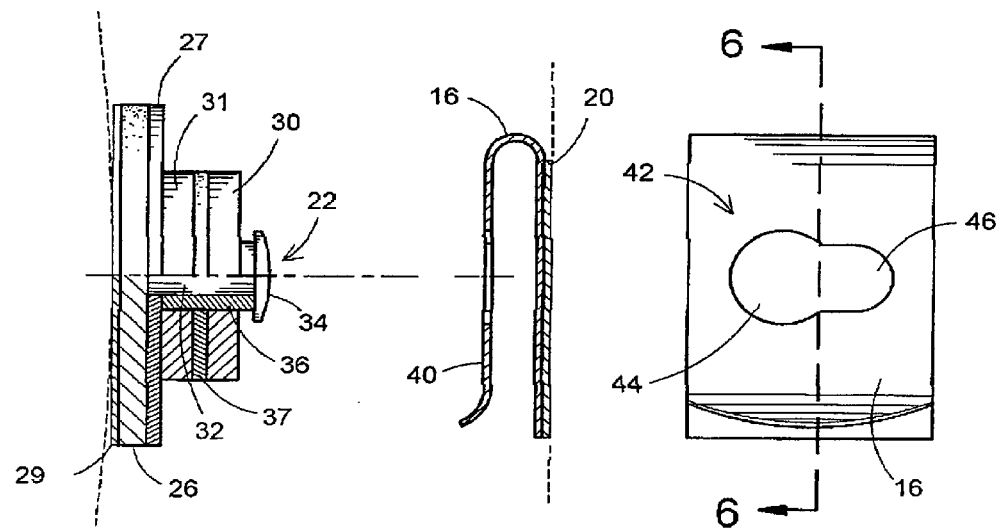
FIG. 3 is an elevational, assembled view of the mounting stud of the present invention, partially in section.
FIG. 5 is a front elevational view of the mounting clip of FIG. 2.
FIG. 6 is a sectional view of the mounting clip taken along the line 6-6 of FIG. 5.
Figure 4:
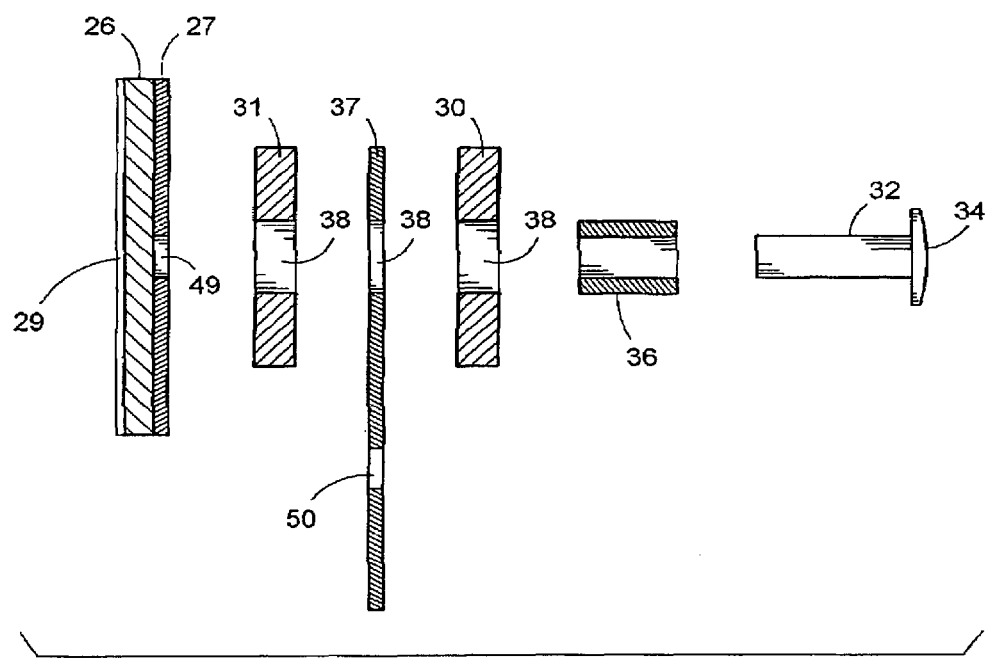
FIG. 4 is an exploded, partial sectional view of the mounting stud of FIG. 3.

FIG. 3 shows an assembled view partly in section and FIG. 4 shows an exploded view of the mounting stud 22. The mounting stud 22 is located by an opening 49 in a metal washer 27 and attaches to the base 26 of the mounting stud 22 and, in turn, attaches to the console 12 with an adhesive strip 29. Spacer washers 30 and 31 sandwich the strap connection tab 37 to secure the tab 37 to the stud 22. The mounting stud 22 is formed of a cylindrical shaft 32 with an enlarged head 34 at the outer end of the shaft 32. It will be appreciated the shaft 32 is circular in cross section and formed with a smooth, finished outer surface that minimizes friction. A metal bushing 36 fits over the shaft 32 and into suitably sized openings 38 in the spacer washers 30 and 31 and the strap connection tab 37. Preferably the bushing 36 is made with metal but may be formed from frictionless plastic such as Teflon.

FIGS. 5 and 6 show the mounting clip 16 formed in an inverted U-shape that is attached to the rear of the electronic device 14 by an adhesive strip 20 as seen in FIG. 2. The outer leg 40 of the clip 16 is provided with a dual section attachment opening 42 for coupling with the mounting stud 22. The attachment opening 42 includes a first section 44 with a larger diameter sized to accommodate insertion of the enlarged head 34 of the mounting stud 22 and a smaller diameter section 46 adjacent the larger diameter section 44 that is sized to locate and position the bushing 36 on the shaft 32 of the mounting stud 22.

In a preferred embodiment of the invention, the mounting clip 16 is mounted on the electronic device 18 such that the longitudinal axis of the clip 16 is perpendicular to the longitudinal axis of the device 18. In other words, the clip 16 is mounted in a side to side location on the device 18 rather than in a top to bottom configuration. The attachment opening 42 of the clip 16 is located perpendicular to the longitudinal axis of the mounting clip 16 whereby an electronic device 18, such as a cell phone, is mounted on a user's belt in a horizontal position and in a vertical position when mounted freely rotatable on a console 12 of a steering wheel 10.

Figure 7:
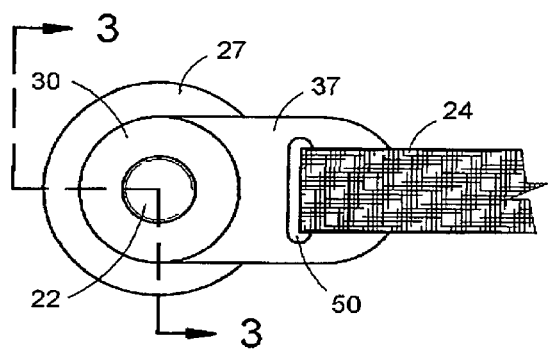
FIG. 7 is a plan view of the mounting stud of FIG. 3 and a safety strap attached thereto.

FIG. 7 is a top plan view of the mounting strap 24 and mounting stud 22 including the strap connection tab 37 with the strap connection slot 50. Also seen is spacer washer 30 and washer 27.

In use, the mounting clip 16 of the electronic device 14 is positioned such that the enlarged head 34 at the end of the cylindrical shaft 32 of the mounting stud 22, is placed into the larger diameter section 44 of the opening 42 of the mounting clip 16 and allowed to enter into the smaller diameter section 46 of the opening 42 either by gravity or by gently inserting it during the attaching process. Because the bushing 36 on the shaft 32 is substantially smooth, and it is sized to fit within the upper opening section 46, it is relatively free to move with minimal friction thereby allowing the electronic device 14 to assume a generally upright configuration due to the downward force of gravity no matter what the relative position of the steering wheel might be at any given time.

Figure 10:
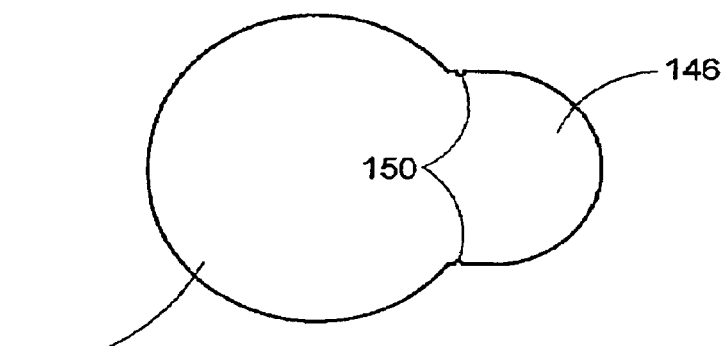
FIG. 10 is a detail of the mounting dip of FIG. 8.
Figure 8:
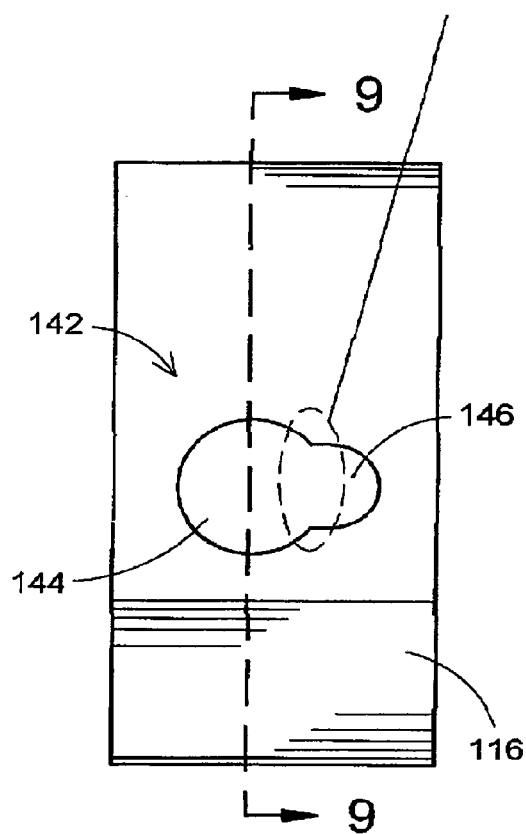
FIG. 8 an elevational view of an alternate embodiment of the mounting clip of FIG. 5.
Figure 9:
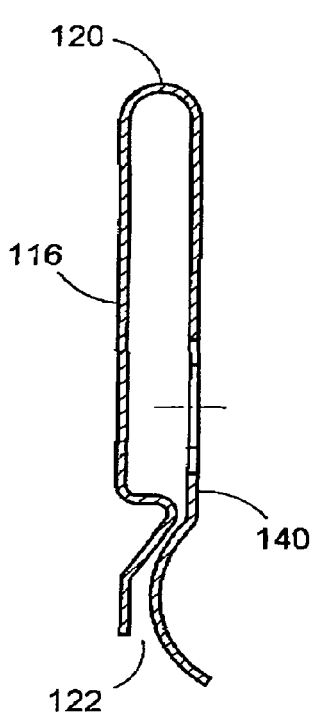
FIG. 9 is a sectional view taken along lines 9-9 of FIG. 8.

FIGS. 8, 9, and 10 show an alternate clip 116 that is designed to be attached to the rear of an electronic device it may be used with. The clip 116 has a closed end 120 and an open end 122 that is designed to facilitate connection to a strap or belt to enable the electronic device to be carried when not attached to a steering wheel of a vehicle. In this embodiment, an opening 142 has a larger diameter opening 144 to accommodate the head portion of a suitable mounting stud, not shown, and a smaller opening 146 sized to fit the mounting stud as described hereinabove with respect to the first embodiment. FIG. 10 shows a more detailed view of the improvement in the structure of the opening 142 of the clip 116 of this embodiment. A pair of protuberances 150 are located at the edge of the smaller opening 146.

The protuberances 150 are sized to create a restriction at the edge of the smaller opening 146 whereby the diameter of the shaft portion of a mounting stud, not shown, is equal to or very slightly larger than distance between the protuberances 150. This enables the mounting stud to be snapped onto the clip 116 by using slight pressure against the protuberances 150 in order to maintain the clip 116 mounted on the stud in the unlikely event an air bag under the steering wheel console 12 is deployed.

The above embodiments of the steering wheel mounting assembly allow a driver of a vehicle to be in close proximity to the electronic device 14 without having to hold, or place attention, on the device 14 once it is activated. In turn, the driver of the vehicle is able to pay full attention to the road and the task at hand of driving the vehicle.

In the event an automotive air bag under the steering wheel is deployed, the safety strap 24 will prevent the electronic device 14 from being projected onto and injuring the driver of the vehicle.

It will be appreciated that the various parts of the steering wheel mount structure may be substituted by similar parts such as a unitary mounting stud or using a different shaped mounting clip. These and other modifications may be made in keeping with the spirit and scope of the invention as defined in the following claims.

The invention claimed is:

1. The combination of a vehicle steering wheel assembly, including a steering wheel having a center console, and an electronic device mounting system that enables said electronic device to be mounted on said steering wheel assembly and maintained thereon in a substantially vertical position regardless of the rotational position of the steering wheel, comprising:

said mounting system including a mounting stud centrally located on said steering wheel assembly and attached to said center console;

said mounting stud being formed with a head and a smaller cylindrical shaft;

said mounting system further including a mounting clip attached to said electronic device having a structure for attachment to said mounting stud;

said mounting clip being formed with a section having a dual opening structure including a first opening to accommodate said mounting stud head and a second opening smaller than said first opening to accommodate said cylindrical shaft;

said mounting clip and said mounting stud characterized by being freely movable, each with the other, whereby said device is maintained in a substantially vertical position by gravity regardless of the position of the steering wheel.

2. The combination of claim 1 wherein said second opening is adjacent said first opening and is shaped to match said cylindrical shaft such that said cylindrical shaft rests in and is freely rotatable in said second opening when said mounting clip attached to said electronic device engages said mounting stud.

3. The combination of claim 2 wherein said second opening further includes a pair of protuberances to maintain said cylindrical shaft of said mounting stud in said opening during rotation of said steering wheel.

4. The combination of claim 1 further including a safety strap to maintain said electronic device attached to said steering wheel in the event said electronic device becomes detached from said center console of said steering wheel assembly during deployment of an air bag; said strap having a first portion attached to said mounting stud and a second portion attached to said steering wheel, whereby a trajectory of the electronic device during air bag deployment toward the driver is limited by the length of the strap.

5. The combination of claim 4 wherein said mounting stud further includes a strap connection tab having an opening for said strap to connect said strap to said mounting stud.

6. The combination of claim 1 wherein said mounting clip is further defined by a generally inverted U-shape that serves as a secure mounting means whereby said electronic device may be mounted to a belt when detached from said steering wheel assembly.

7. The combination of a vehicle steering wheel assembly, including a steering wheel having a center console, and an electronic device mounting system that enables said device to be mounted on said center console of said steering wheel assembly and maintained thereon in a substantially vertical position regardless of the rotational position of the steering wheel, comprising:
said mounting system including a mounting stud centrally located on said steering wheel assembly and attached to said center console;
a mounting clip attached to said electronic device having a structure for attachment to said mounting stud;
said mounting stud being formed with a head and a smaller cylindrical shaft; said mounting clip being formed with a section having a dual opening structure including a first opening to accommodate said mounting stud head and a second opening smaller than said first opening to accommodate said cylindrical shaft;
said mounting dip and said mounting stud characterized by being freely movable each with the other whereby said device is maintained in a substantially vertical position by gravity regardless of the position of the steering wheel;
and, a safety strap to maintain said electronic device attached to said steering wheel in the event said electronic device becomes detached from said center console during deployment of an air bag; said strap having a first portion attached to said mounting stud and a second portion attached to said steering wheel, whereby a trajectory of the device during air bag deployment toward the driver is limited by the length of the strap.

8. The combination of claim 7 wherein said second opening further includes a pair of protuberances to maintain said cylindrical shaft of said mounting stud in said opening during rotation of said steering wheel.

9. The combination of a vehicle steering wheel assembly, including a steering wheel having a center console, and an electronic device mounting system that enables said device to be mounted on said steering wheel assembly and maintained thereon in a substantially vertical position regardless of the rotational position of the steering wheel, comprising:
said mounting system including a mounting stud centrally located on said steering wheel assembly and attached to said center console;
a mounting clip attached to said electronic device having a structure for attachment to said mounting stud; said mounting clip and said mounting stud characterized by being freely movable each with the other whereby said device is maintained in a substantially vertical position by gravity regardless of the position of the steering wheel;
and, a safety strap to maintain said electronic device attached to said steering wheel in the event said electronic device becomes detached from said center console of said steering wheel assembly during deployment of an air bag;
said strap having a first portion attached to said mounting stud and a second portion attached to said steering wheel, whereby a trajectory of the device during air bag deployment toward the driver is limited by the length of the strap.

10. The combination of claim 9 wherein said strap is further defined as being made of flexible material and having a first portion attached to said mounting stud and a second portion looped around said steering wheel.

\* \* \* \* \*